United States Patent
Muehl et al.

(10) Patent No.: US 8,392,291 B2
(45) Date of Patent: Mar. 5, 2013

(54) AUTOMATED STRUCTURING

(75) Inventors: Gordon Muehl, Oestringen (DE); Klaus Irle, Walldorf (DE); Walter G. Kienle, St. Leon-Rot (DE); Knut Heusermann, Rauenberg (DE)

(73) Assignee: SAP Aktiengesellschaft, Walldorf (DE)

( * ) Notice: Subject to any disclaimer, the term of this patent is extended or adjusted under 35 U.S.C. 154(b) by 3229 days.

(21) Appl. No.: 10/286,391

(22) Filed: Oct. 31, 2002

(65) Prior Publication Data
US 2004/0088070 A1    May 6, 2004

(51) Int. Cl.
G06Q 10/00    (2006.01)
(52) U.S. Cl. .......................................... 705/28; 235/385
(58) Field of Classification Search ............... 705/22, 705/28, 29; 235/385; 340/571.1, 571.2, 340/571.3
See application file for complete search history.

(56) References Cited

U.S. PATENT DOCUMENTS

| | | |
|---|---|---|
| 5,025,140 A | 6/1991 | Varley |
| 5,237,679 A | 8/1993 | Wang et al. |
| 5,291,583 A | 3/1994 | Bapat |
| 5,398,336 A | 3/1995 | Tantry et al. |
| 5,434,775 A | 7/1995 | Sims et al. |
| 5,592,667 A | 1/1997 | Bugajski |
| 5,724,577 A | 3/1998 | Exley et al. |
| 5,737,732 A | 4/1998 | Gibson et al. |
| 5,774,876 A * | 6/1998 | Woolley et al. ............ 705/28 |
| 5,825,651 A | 10/1998 | Gupta et al. |
| 5,832,471 A | 11/1998 | Fukui |
| 5,845,287 A | 12/1998 | Henrion |
| 5,956,688 A | 9/1999 | Kokubo et al. |
| 5,982,889 A | 11/1999 | DeMont |
| 6,249,227 B1 * | 6/2001 | Brady et al. ............ 340/572.1 |
| 6,313,745 B1 | 11/2001 | Suzuki |
| 6,374,252 B1 | 4/2002 | Althoff et al. |
| 6,427,123 B1 | 7/2002 | Sedlar |
| 6,609,129 B1 | 8/2003 | Luh |
| 6,898,792 B1 | 5/2005 | Burke |
| 2001/0044791 A1 | 11/2001 | Richter et al. |
| 2002/0002504 A1 | 1/2002 | Engel et al. |
| 2002/0008621 A1 * | 1/2002 | Barritz et al. ............ 340/572.1 |
| 2002/0120598 A1 | 8/2002 | Shadmon et al. |
| 2002/0143667 A1 | 10/2002 | Ho |
| 2002/0184210 A1 | 12/2002 | Khan |

(Continued)

FOREIGN PATENT DOCUMENTS
WO    WO 01/44082 A1    6/2001

OTHER PUBLICATIONS
Codd, E. F., "A Relational Model of Data for Large Shared Data Banks," Communications of the Association for Computing Machinery, Association for Computing Machinery 13: Jun. 6, 1970, pp. 377-387, XP002219025.

(Continued)

*Primary Examiner* — M. Thein
(74) *Attorney, Agent, or Firm* — Fish & Richardson P.C.

(57) ABSTRACT

A computer-implemented method for the automated structuring of data representing a tangible system. The method includes receiving first item information describing a first tangible item of the system, receiving first item position information describing a position of the first item, receiving second item information describing a second tangible item of the system, receiving second item position information describing a position of the second item, and characterizing a relationship between the first item and the second item based at least in part upon the first item position information and the second item position information.

19 Claims, 10 Drawing Sheets

U.S. PATENT DOCUMENTS

2002/0190862 A1  12/2002  Berquist et al.
2003/0154191 A1   8/2003  Fish et al.
2004/0102865 A1   5/2004  Heusermann et al.
2006/0119471 A1*  6/2006  Rudolph et al. ........... 340/10.41

OTHER PUBLICATIONS

Publication entitled "Structuring as a Basis for Product Modeling," by N. H. Mortensen and C. T. Hansen, from *Critical Enthusiasm-Contributions to Design Science: A Festschrift for Mogens Myrup Andreasen on the Occasion of his 60th Birthday*, pp. 111-128, Dec. 17, 1999.

Mortensen, et al., "Structuring as a Basis for Product Modeling," *Critical Enthusiasm- Contributions to Design Science: A Festschriftfor Mogens Myrup Andreasen on the Occasion of his 60th Birthday*, pp. 111-128, Dec. 17, 1999.

U.S. Appl. No. 11/612,420, filed Dec. 18, 2006, entitled "Automated Structuring", Heusermann, et al.

* cited by examiner

| Header<br>Bits 0-7 | EPC<br>Manager<br>Bits 8-35 | Object<br>Class<br>Bits 36-59 | Object Serial<br>Number<br>Bits 60-95 |
|---|---|---|---|
| 96-Bit Electronic Product Code. MIT AutoID Center ||||

600

| Guid | Category | Location | Time |
|---|---|---|---|
| 12377 | Monitor | 376 | 8:05 |
| 12653 | Case | 380 | 8:30 |
| 12623 | Network Card | 380 | 8:30 |
| 12345 | Sound Card | 380 | 8:30 |
| 12377 | Monitor | 370 | 9:12 |
| 12379 | Case | 374 | 9:15 |
| 12379 | Case | 376 | 9:16 |
| *12347* | *Monitor* | *380* | *10:00* |
| 12347 | Monitor | 378 | 10:01 |
| 12653 | Case | 48°8´N 11°35´E (Room 315) | 10:33 |
| 12623 | Network Card | 48°8´N 11°35´E (Room 315) | 10:33 |
| 12345 | Sound Card | 48°8´N 11°35´E (Room 315) | 10:33 |
| *12377* | *Monitor* | *365* | *10:55* |
| 12379 | Case | 378 | 11:16 |
| 12390 | Network Card | 378 | 11:20 |
| 11008 | Keyboard | 376 | 11:21 |
| 11008 | Keyboard | 378 | 11:22 |
| 12377 | Monitor | 365 | 12:35 |
| 12379 | Case | 48°8´N 11°35.3´E (Room 325) | 13:55 |
| 12390 | Network Card | 48°8´N 11°35.3´E (Room 325) | 13:55 |
| 12347 | Monitor | 48°8´N 11°35.3´E (Room 325) | 13:55 |
| 11008 | Keyboard | 48°8´N 11°35.3´E (Room 325) | 13:55 |
| 12377 | Monitor | 365 | 14:53 |

| Guid | Category | Location | Time |
|---|---|---|---|
| 12377 | Monitor | 376 | 8:05 |
| 12653 | Case | 380 | 8:30 |
| 12623 | Network Card | 380 | 8:30 |
| 12345 | Sound Card | 380 | 8:30 |
| 12379 | Case | 376 | 9:16 |
| 12347 | Monitor | 380 | 10:00 |
| 12653 | Case | 48°8´N 11°35´E (Room 315) | 10:33 |
| 12623 | Network Card | 48°8´N 11°35´E (Room 315) | 10:33 |
| 12345 | Sound Card | 48°8´N 11°35´E (Room 315) | 10:33 |
| 11008 | Keyboard | 376 | 11:21 |

_710_

| Guid | Category | Location | Time |
|---|---|---|---|
| 12347 | Monitor | 378 | 10:01 |
| 12379 | Case | 378 | 11:16 |
| 12390 | Network Card | 378 | 11:20 |
| 11008 | Keyboard | 378 | 11:22 |
| 12379 | Case | 48°8´N 11°35.3´E (Room 325) | 13:55 |
| 12390 | Network Card | 48°8´N 11°35.3´E (Room 325) | 13:55 |
| 12347 | Monitor | 48°8´N 11°35.3´E (Room 325) | 13:55 |
| 11008 | Keyboard | 48°8´N 11°35.3´E (Room 325) | 13:55 |

_715_

| Guid | Category | Location | Time |
|---|---|---|---|
| 12377 | Monitor | 365 | 10:55 |
| 12377 | Monitor | 365 | 12:35 |
| 12377 | Monitor | 365 | 14:53 |

| | Guid | Category | Location | Time |
|---|---|---|---|---|
| 720 | ~~12377~~ | ~~Monitor~~ | ~~376~~ | ~~8:05~~ |
| 722 | ~~12653~~ | ~~Case~~ | ~~380~~ | ~~8:30~~ |
| 724 | ~~12623~~ | ~~Network Card~~ | ~~380~~ | ~~8:30~~ |
| 726 | ~~12345~~ | ~~Sound Card~~ | ~~380~~ | ~~8:30~~ |
| 728 | ~~12379~~ | ~~Case~~ | ~~376~~ | ~~9:16~~ |
| 730 | ~~12347~~ | ~~Monitor~~ | ~~380~~ | ~~10:00~~ |
| 732 | 12653 | Case | 48°8′N 11°35′E (Room 315) | 10:33 |
| 734 | 12623 | Network Card | 48°8′N 11°35′E (Room 315) | 10:33 |
| 736 | 12345 | Sound Card | 48°8′N 11°35′E (Room 315) | 10:33 |
| 738 | ~~11008~~ | ~~Keyboard~~ | ~~376~~ | ~~11:21~~ |

710'

| | Guid | Category | Location | Time |
|---|---|---|---|---|
| 740 | ~~12347~~ | ~~Monitor~~ | ~~378~~ | ~~10:01~~ |
| 742 | ~~12379~~ | ~~Case~~ | ~~378~~ | ~~11:16~~ |
| 744 | ~~12390~~ | ~~Network Card~~ | ~~378~~ | ~~11:20~~ |
| 746 | ~~11008~~ | ~~Keyboard~~ | ~~378~~ | ~~11:22~~ |
| 748 | 12379 | Case | 48°8′N 11°35.03′E (Room 325) | 13:55 |
| 750 | 12390 | Network Card | 48°8′N 11°35.03′E (Room 325) | 13:55 |
| 752 | 12347 | Monitor | 48°8′N 11°35.03′E (Room 325) | 13:55 |
| 754 | 11008 | Keyboard | 48°8′N 11°35.03′E (Room 325) | 13:55 |

715'

| | Guid | Category | Location | Time |
|---|---|---|---|---|
| 756 | ~~12377~~ | ~~Monitor~~ | ~~365~~ | ~~10:55~~ |
| 758 | ~~12377~~ | ~~Monitor~~ | ~~365~~ | ~~12:35~~ |
| 760 | 12377 | Monitor | 365 | 14:53 |

| GUID | CATEGORY | BEGIN LOCATION | END LOCATION | BEGIN TIME | END TIME |
|---|---|---|---|---|---|
| 4673 | LIFTING TABLE 1110 | 48°8′ N 11°35.0310′ E | 48°8′ N 11°35.0313′ E | 8:00:00 | 8:05:39 |
| 4337 | FEED DEVICE 1105 | 48°8′ N 11°35.0310′ E | 48°8′ N 11°35.0311′ | 8:02:33 | 8:02:41 |
| 4337 | FEED DEVICE 1105 | 48°8′ N 11°35.0310′ E | 48°8′ N 11°35.0311′ | 8:03:53 | 8:04:01 |
| 4337 | FEED DEVICE 1105 | 48°8′ N 11°35.0310′ E | 48°8′ N 11°35.0311′ | 8:05:33 | 8:05:37 |
| 4627 | BRUSHING MACHINE 1115 | 48°8′ N 11°35.0313′ E | 48°8′ N 11°35.0314′ | 8:05:42 | 8:06:02 |
| 4347 | FINISH APPLICATOR 1120 | 48°8′ N 11°35.0314′ E | 48°8′ N 11°35.0315′ E | 8:06:13 | 8:08:13 |
| 4375 | CONVEYOR 1125 | 48°8′ N 11°35.0315′ E | 48°8′ N 11°35.0316′ E | 8:08:15 | 8:08:19 |
| 4371 | CURING TABLE 1130 | 48°8′ N 11°35.0316′ E | 48°8′ N 11°35.0317′ E | 8:08:20 | 8:18:19 |
| 4391 | PRESS 1135 | 48°8′ N 11°35.0317′ E | 48°8′ N 11°35.0318′ E | 8:18:22 | 8:18:32 |
| 4377 | CONVEYOR 1140 | 48°8′ N 11°35.0318′ E | 48°8′ N 11°35.0319′ E | 8:18:33 | 8:18:36 |
| 3211 | PULL DEVICE 1145 | 48°8′ N 11°35.0319′ E | 48°8′ N 11°35.0320′ E | 8:18:37 | 8:18:39 |
| 5553 | PRODUCT BENCH 1150 | 48°8′ N 11°35.0320′ E | 48°8′11.0001 N°35.0320′ E | 8:18:40 | 8:35:22 |

AUTOMATED STRUCTURING

BACKGROUND

This invention relates to computer-readable tags and tag reading systems.

The tagging of tangible items with computer-readable identifiers and information has provided great improvements in areas such as supply chain management, asset tracking and management, security and access control, transportation, toll collection, baggage handling, inventory control and management, healthcare, and consumer services. For example, bar codes can be used to track the storage and movement of objects ranging from foodstuffs to coupons. Radio frequency identification ("RFID") tags can be used to track individuals as they access restricted locations and services. Smart cards can be used to store insurance information, medical records, and phone accounts. Examples of computer-readable tags include, active and passive RFID tags, integrated circuit ("IC") microprocessor cards and memory cards, optical memory cards, barcodes, tags, and smart cards.

SUMMARY

The present invention provides methods and apparatus, including computer program products, for the automated structuring of data representing a system. As used herein, structuring refers to the characterization of relationships between tangible items in a system. A system is a collection of items that are related by some feature. For example, the items in a system can be related by function, by location, in time, by deployment, or by purpose.

In general, in one aspect, the invention features a computer-implemented method for the automated structuring of data representing a system. The method includes receiving first item information describing a first tangible item in the system, receiving first item position information describing a position of the first item, receiving second item information describing a second tangible item of the system, receiving second item position information describing a position of the second item, and characterizing a relationship between the first item and the second item based at least in part upon the first item position information and the second item position information.

The invention can be implemented to include one or more of the following features. The relationship can be characterized by determining a position of the first item relative to the second item or identifying that the first item and the second item are in a common location. For example, the first item and the second item can be identified as being in a same room. The relationship can also be characterized as a component/subcomponent relationship between the first item and the second item or by characterizing a structural relationship between the first item and the second item. The relationship can also be characterized by characterizing a position in a stream of the first item relative to the second item. The position in the stream can be the position of the first item relative to the second item in a manufacturing line.

Characterizing the relationship between the first item and the second item can include locating a third item and a fourth item having a previously characterized relationship and copying the previously characterized relationship to characterize the relationship between the first item and the second item. The first item can belong to a first item category and the second item can belong to a second item category. Locating the third item can include locating the third item belonging to the first item category. Locating the fourth item can include locating the fourth item belonging to the second item category.

The method for the automated structuring of data representing a system can include characterizing the relationship between the first item, the second item, and a plurality of additional items based at least in part upon the first item position information, the second item position information, and additional position information regarding the plurality of additional items.

In general, in another aspect, the invention features a computer program product for the automated structuring of data representing a tangible system. The computer program product is operable to cause a data processing apparatus to receive information identifying two tangible items in the system, select a relationship between two other items based at least in part upon a common characteristic of the two items in the system and the two other items, and characterize a relationship between the two items in the system based at least in part upon the selected relationship between the two other items. The computer program product can be tangibly embodied in an information carrier.

The invention can be implemented to include one or more of the following features. The product can also be operable to cause the data processing apparatus to receive information identifying the positions of the two items. The information can be received, e.g., from an interrogator that identifies the two items by interrogating tags on the two items. The interrogator can be, e.g., a mobile interrogator or a wireless interrogator that wirelessly interrogates the tags on the two items. The received information can identify the positions of two items in an assembly line.

The product can also be operable to cause the data processing apparatus to eliminate redundant information regarding at least one of the two items. The redundant information can be eliminated based upon a time of collection of the redundant information.

The product can also be operable to cause the data processing apparatus to identify the categories of the two items in the system from the received information, or to characterize the relationship between the two items in the system as a component/subcomponent relationship.

The product can also be operable to cause the data processing apparatus to receive information identifying positions of a plurality of additional items in the system and pool the information identifying the items based upon a shared characteristic of the items. The information identifying the items can be pooled based upon a shared position of the items.

The invention can be implemented to realize one or more of the following advantages. The automated structuring of unstructured systems rapidly characterizes one or more relationships between items in the system, thereby minimizing the need for user input and other costs associated with describing systems. Automated structuring can also draw upon a computer-readable knowledge base of common system designs and characteristics in characterizing relationships, thereby reducing the likelihood of error and ensuring uniformity in the descriptions of systems. Since automated structuring draws upon such an existing knowledge base, automated structuring, in effect, relies upon established characterizations of relationships without requiring explicit expression of the rules by a user.

Moreover, since automated structuring can operate in conjunction with automated interrogation and data collection, the management of items is greatly simplified. These automated processes can provide a user such as a company with a relatively complete description of the deployment of resources.

For example, a company can track the deployment of assets such as information technology equipment at a company site. Tracking the deployment of assets can provide the company with a description of the position of assets and the operational relationships between assets as a function of time, allowing the company to manage and increase productivity.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 6 shows an example of position information that can be gathered as tagged items change position in the structure of FIG. 3.

FIG. 7 shows an example of how position information can be pooled based on the position of tagged items in the structure of FIG. 3.

FIG. 8 shows an example of how redundant position information can be excluded from the pools of FIG. 7.

FIG. 13 shows an example of position information that can be gathered as the tag interrogator changes position in the structure of FIG. 11.

Like reference symbols in the various drawings indicate like elements.

DETAILED DESCRIPTION

Figures 1, 2:
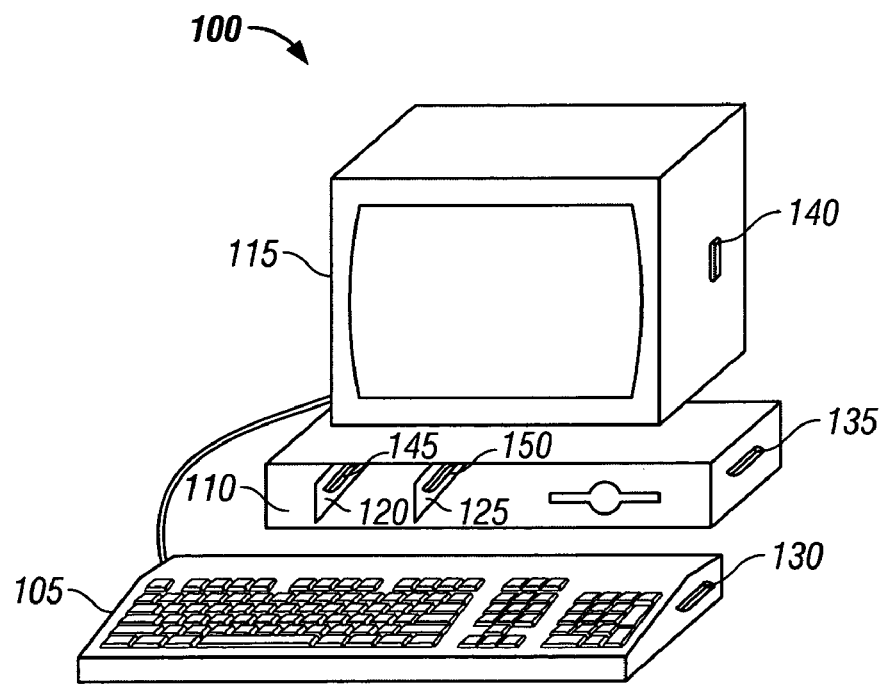
FIG. 1 shows an example of a portion of an information technology system that includes tangible, tagged items.
FIG. 2 shows an example of a unique identification code.

FIG. 1 shows an example of a portion of an information technology system, namely a computer 100, that is tagged. Computer 100 includes items, namely a keyboard 105, a case 110, and a monitor 115, that are detachably assembled together. Case 110 includes a pair of component card items 120, 125. Keyboard 105 is tagged with a tag 130, case 110 is tagged with a tag 135, monitor 115 is tagged with a tag 140, card 120 is tagged with a tag 145, and card 125 is tagged with a tag 150.

Tags 130, 135, 140, 145, 150 are electronically-accessible in that they store data in a machine-readable format. In particular, tags 130, 135, 140, 145, 150 store a computer-readable globally unique identifier ("GUID") and a category identifier. One such globally unique identifier is the Electronic Product Code ("ePC") of the MIT (Massachusetts Institute of Technology) AutoID Center. FIG. 2 illustrates the format of the ePC. The EPC is a 96 bit electronic product code that includes a header 205, manager bits 210, object class bits 215, and an object serial number 220. Manager bits 210 are used by a memory manager to manage memory. Object class bits 215 identify the category of the product described by the ePC and object serial number 220 uniquely identifies the product described by the ePC.

Regardless of the particular format, tags 130, 135, 140, 145, 150 store a category identifier that identifies a category of the respective item. Table 1 includes an example category for each of tags 130, 135, 140, 145, 150.

TABLE 1

| TAG | CATEGORY |
|---|---|
| 130 | Keyboard 11C |
| 135 | Case 14 |
| 140 | 14" Monitor |
| 145 | Network Card 1345A |
| 150 | Sound Card 5556 |

Tags 130, 135, 140, 145, 150 can be, e.g., active and passive RFID tags, integrated circuit ("IC") microprocessor cards and memory cards, optical memory cards, barcodes, molecular tags, smart cards, or other computer-readable storage devices that include information relating to the identification of keyboard 105, case 110, monitor 115, and cards 120, 125, respectively. Tags 130, 135, 140, 145, 150 can also include a processor to process data.

Figure 3:
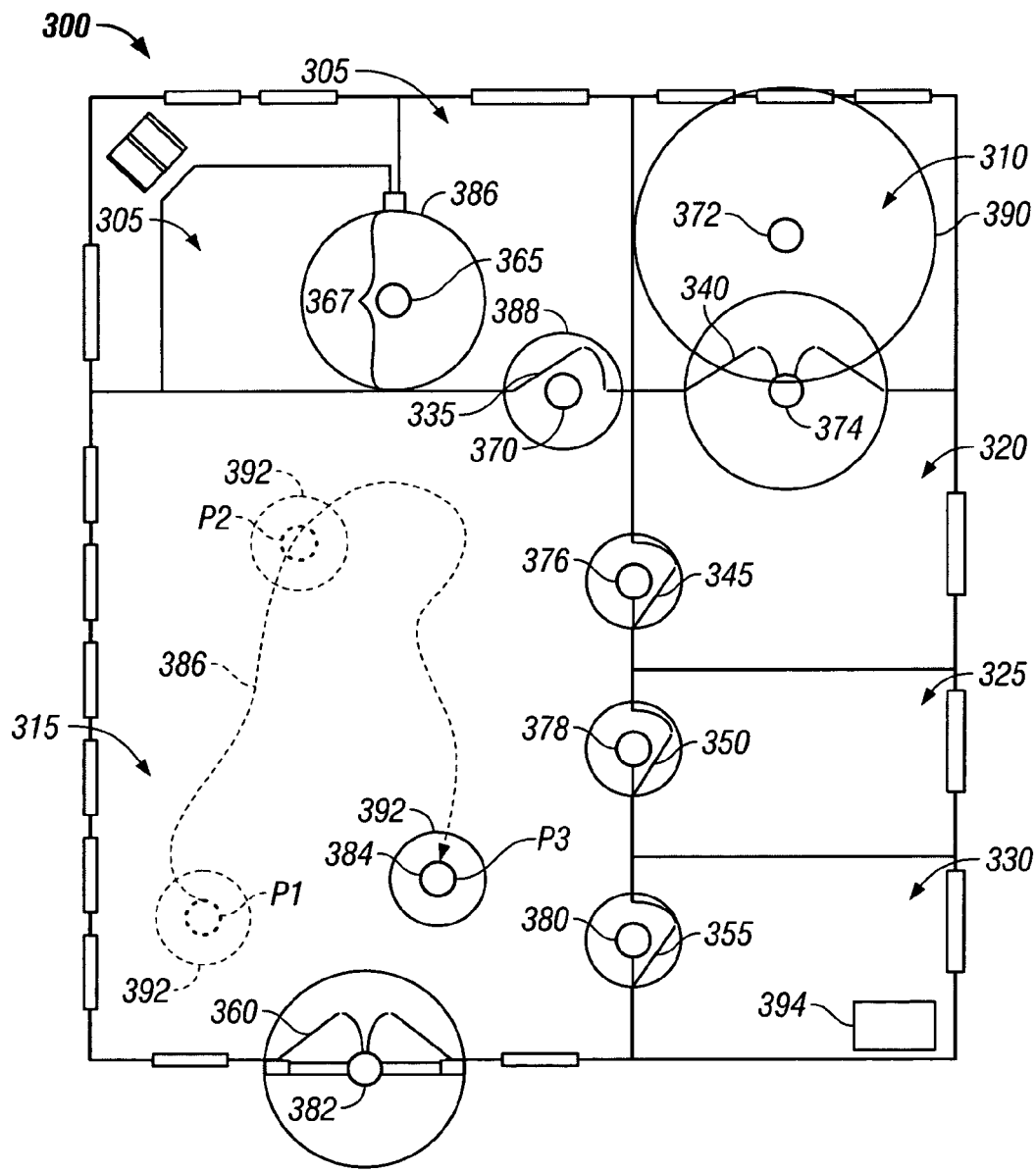
FIG. 3 shows a structure that includes tag interrogators.

A company or other user can deploy an asset like computer 100 at a site or within a structure. FIG. 3 shows an example structure that includes tag interrogators, namely a building 300. Building 300 includes rooms 305, 310, 315, 320, 325, 330 and doors 335, 340, 345, 350, 355, 360. Door 335 separates room 305 from room 315. Door 340 separates room 3110 from room 320. Door 345 separates room 320 from room 315. Door 350 separates room 325 from room 315. Door 355 separates room 330 from room 315. Door 360 separates room 315 from the outside of building 300.

Building 300 includes tag interrogators 365, 370, 372, 374, 376, 378, 380, 382, 384. Tag interrogators can be any device capable of reading from a tag (e.g., tags 130, 135, 140, 145, 150) such as, e.g., optical scanners, transceivers, molecular reader, card readers, card-accepting devices, or other devices for reading data from tags. Tag interrogators may also be operable to write to tags as part of the interrogation. Tag interrogators can be interfaced with a computer or other data processing device, as discussed further below.

Tag interrogators 365, 370, 372, 374, 376, 378, 380, 382 are located at static positions within building 300. In particular, tag interrogator 365 is statically located at a position along a path 367 within room 305, tag interrogator 370 is statically located at door 335, tag interrogator 372 is statically located in the middle of room 310, tag interrogator 374 is statically located at door 340, tag interrogator 376 is statically located at door 345, tag interrogator 378 is statically located at door 350, tag interrogator 380 is statically located at door 355, and tag interrogator 382 is statically located at door 360.

Tag interrogators 365, 370, 372, 374, 376, 378, 380, 382 interrogate tags (such as any of tags 130, 135, 140, 145, 150) when the tags are within an interrogation range of their corresponding static positions. This interrogation can be used to determine the position of tags relative to each other and within building 300. For example, tag interrogator 365 interrogates any tag within a range 386 of the static position of tag 365 along path 367 within room 305. As another example, tag interrogator 370 interrogates any tag within a range 388 of door 335. As yet another example, tag interrogator 372 interrogates any tag within a range 390 of the middle of room 310.

As illustrated in FIG. 3, the interrogation range of tag interrogators 365, 370, 372, 374, 376, 378, 380, 382 can vary.

For example, range 390 is larger than range 386, and range 386 is larger than range 388. Moreover, a user can select the static positions and interrogation ranges of tag interrogators 365, 370, 372, 374, 376, 378, 380, 382 to provide coverage of "bottlenecks" such as doors and paths in building 300. For example, tag interrogator 370, statically located at door 335 and having range 388, can interrogate any tag moved through door 335. Similarly, tag interrogator 365, statically located along path 367 within room 305 and having range 386, can interrogate tag moved along the path within room 305.

By statically positioning tag interrogators at bottlenecks in a structure, the position of tagged items and components can be tracked with relatively high resolution. In particular, since the range of a tag interrogator can substantially match the size of a bottleneck, a relatively high degree of spatial resolution can be achieved. Moreover, since tagged components can move into and out of the range of a tag interrogator, a relatively high degree of temporal resolution of the position of the item can be achieved by monitoring the time of interrogation. In other words, a tag interrogator with a range that substantially matches the size of a bottleneck can read an item GUID from a tag to continuously track the movement of the item relative to the static position of the bottleneck at the time of interrogation.

Tag interrogator 384 does not have a static position in building 300. Rather tag interrogator 384 dynamically moves through building 300. For example, tag interrogator 384 moves from position P1 through a position P2 to a position P3 along a path 386 through room 315. As tag interrogator 384 moves along path 386, tag interrogator 384 interrogates tags that fall within an interrogation range 392. Moreover, tag interrogator 384 can receive positional information regarding the interrogation position along path 386 from, e.g., a global positioning system (GPS) or a local positioning system.

Tag interrogator 384 can thus read an item GUID from a tagged item or component to identify the position of moving and static items and components with relatively high resolution. In particular, since the range of a tag interrogator 384 can be relatively small, a relatively high degree of spatial resolution can be achieved. Moreover, since tag interrogator 384 can be moved, tagged items or components can enter and exit interrogation range 392 of tag interrogator 384. This relative movement between tag interrogator 384 and a tagged item or component achieves a relatively high degree of temporal resolution of the position of the item by monitoring the time of interrogation. In other words, tag interrogator 384 can read an item GUID from a tag to identify the position of the item at the time of interrogation.

Room 330 in building 300 houses a data processing system 394. Data processing system 394 can be, e.g., a computer or other device for processing data. Data processing system 394 can interface directly or indirectly with tag interrogators 365, 370, 372, 374, 376, 378, 380, 382, 384. For example, data processing system 394 can receive information directly from tag interrogators 365, 370, 372, 374, 376, 378, 380, 382, 384 over a wired or wireless connection. Alternatively, data processing system 394 can receive information over an indirect route that includes an intermediate mobile device (not shown) that reads and assembles interogation data from tag interrogators 365, 370, 372, 374, 376, 378, 380, 382, 384 and then interfaces with data processing system 394.

The interface between data processing system 394 and tag interrogators 365, 370, 372, 374, 376, 378, 380, 382, 384 need not be continuous. For example, tag interrogator 384 can be intermittently brought into room 330 and connected to a specialized data communication port (not shown) to interface with data processing system 394.

Regardless of the nature of the interface, data processing system 394 receives data regarding the interrogation of tags by tag interrogators 365, 370, 372, 374, 376, 378, 380, 382, 384. For example, data processing system 394 can receive, e.g., data regarding the tag interrogator performing the interrogation, a GUID and a category of the tagged item read from the tag, as well as the time of the interrogation. If data is received at a known delay after the time of interrogation, then data processing system 394 need not receive data regarding the time of the interrogation. Moreover, if data processing system 394 has access to a database that can be used to identify the category of the item from the GUID, then data processing system 394 need not receive data regarding the category of the tagged item.

Figure 4:
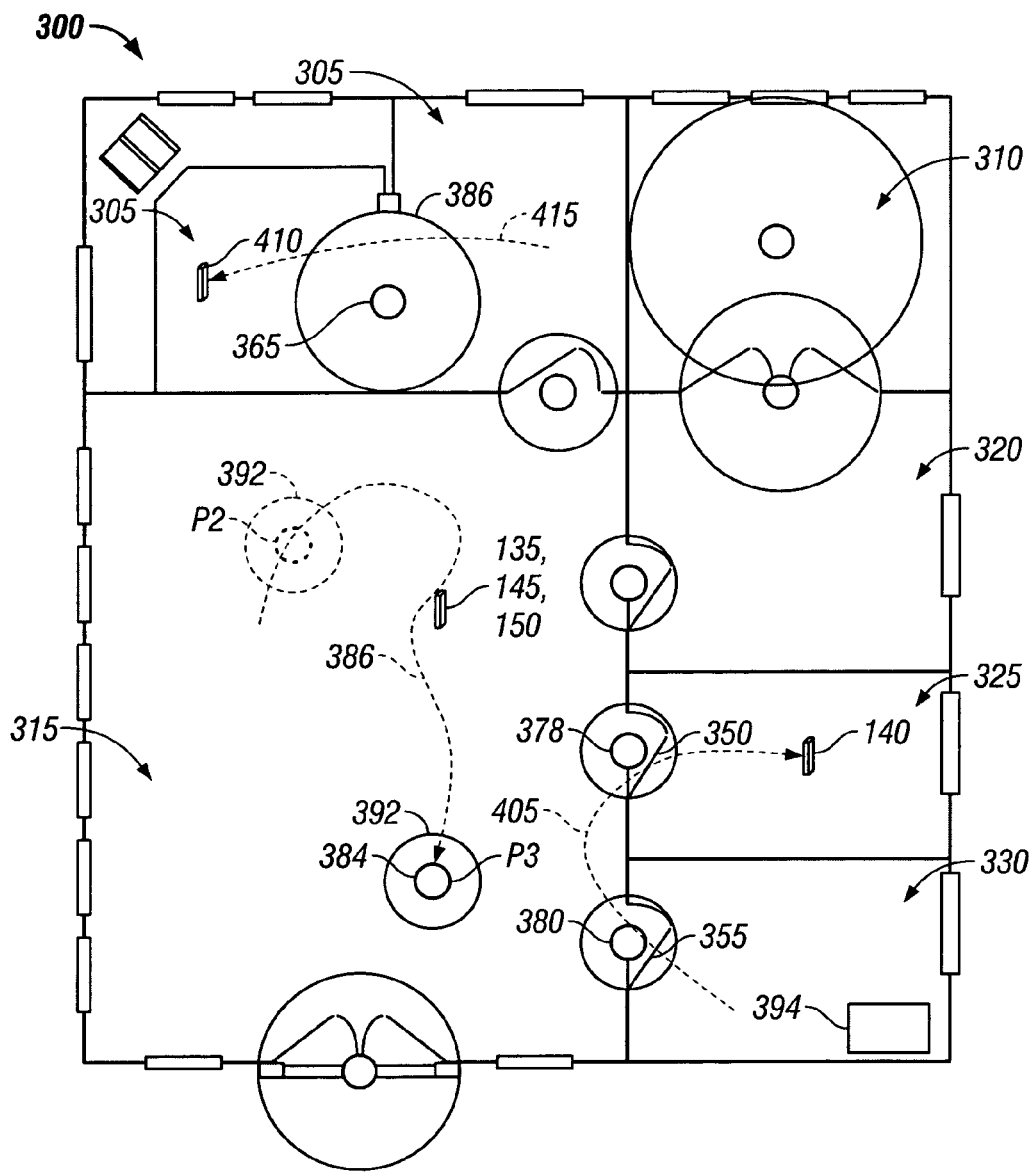
FIG. 4 shows tagged items changing position in the structure of FIG. 3.

FIG. 4 illustrates the operation of the tag interrogators 365, 370, 372, 374, 376, 378, 380, 382 within building 300. As shown in FIG. 4, tag 140 (along with monitor 115, not shown) moves along a path 405 from room 330, through door 335 into room 315, and then through door 350 into room 325. In moving along path 405, tag 140 is interrogated twice. Namely, tag interrogator 380 interrogates tag 140 as it passes through door 355 and tag interrogator 378 interrogates tag 140 as it passes through door 350. Both tag interrogators 380, 378 transmit data regarding the interrogation to data processing system 394.

Room 305 in building 300 houses a tag 410. Tag 410 tags a second monitor (not shown). Tag 410 (along with the second monitor) moves along a path 415 within room 305. In moving along path 415, tag 410 is interrogated by tag interrogator 365. Tag interrogator 365 transmits data regarding the interrogation to data processing system 394.

Tags 135, 145, 150 (along with case 110 and cards 120, 125, not shown) are statically positioned within room 315. Tag interrogator 384 interrogates tags 135, 145, 150 as tag interrogator is moved through room 315 along path 386. Tag interrogator 384 transmits data regarding the interrogation to data processing system 394.

Figure 5:
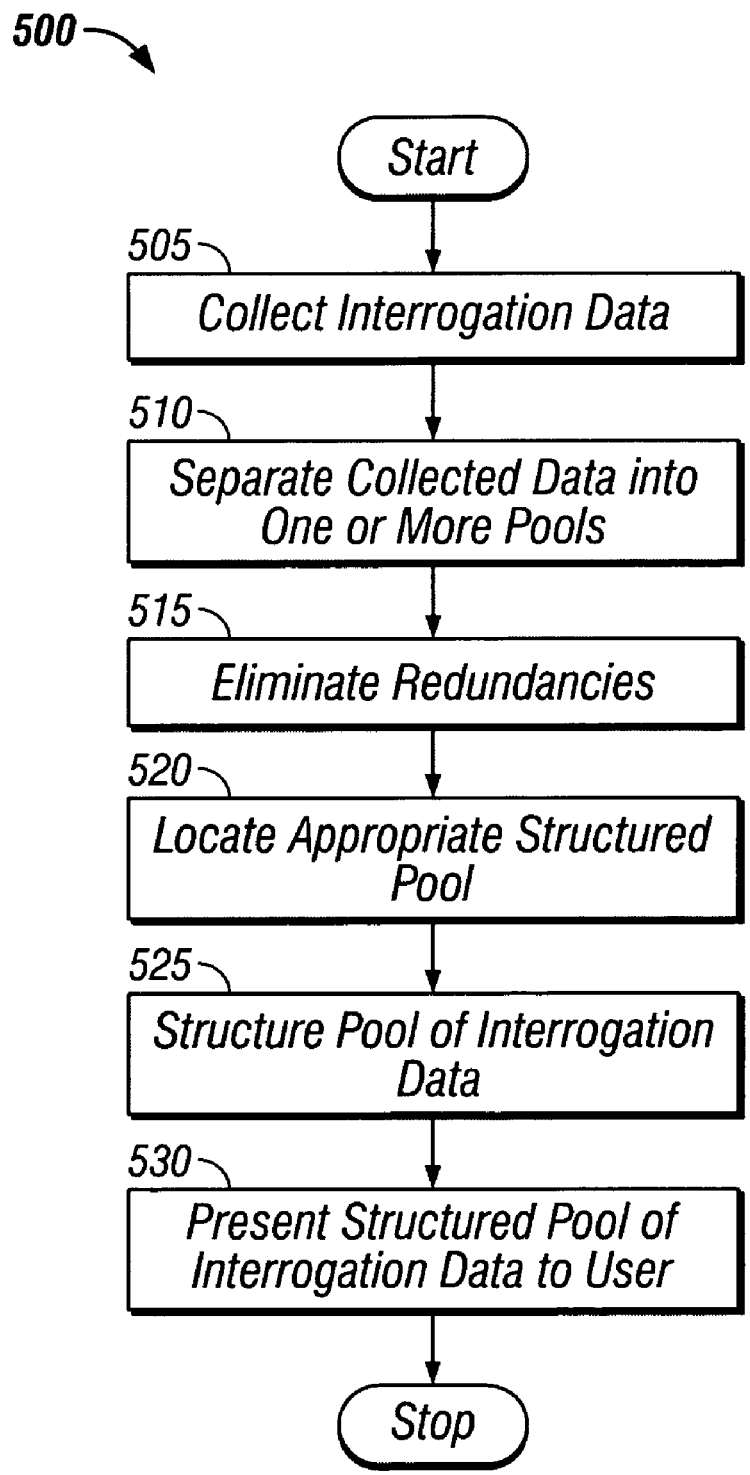
FIG. 5 shows a method for establishing relationships between items based upon their position.

FIG. 5 shows a method 500 for structuring an asset or a system of assets. A data processing system can perform method 500 using information regarding the interrogation of tags by tag interrogators. For example, data processing system 394 can perform method 500 using information regarding the interrogation of tags 135, 140, 145, 150, 410 by tag interrogators 365, 370, 372, 374, 376, 378, 380, 382, 384. Alternatively, a mobile intermediate device (not shown) can perform method 500 using interrogation data read and assembled from tag interrogators 365, 370, 372, 374, 376, 378, 380, 382, 384.

A system performing method 500 collects interrogation data regarding the interrogation of tags by tag interrogators (step 505). A data processing system can collect the interrogation data continuously even during the performance of other steps in method 500.

By way of example, as shown in FIG. 6, as data processing system 394 receives interrogation information from tag interrogators 365, 370, 372, 374, 376, 378, 380, 382, 384. Data processing system 394 can collect the received data in a data collection 600. Data collection 600 can be, e.g., a table or other data structure. Data collection 600 includes GUIDs of the interrogated tags 605, categories of the tagged items 610, locations of the interrogation 615, and times of the interrogation 620. The data in data collection 600 shown in boldface type can result from the interrogation of tags 135, 140, 145, 150, 410 as shown in FIG. 4.

In data collection 600, GUIDs 605 and categories 610 are read from the interrogated tags by an interrogator and transmitted to data processing system 394 (FIG. 4). As described above, the category of the tagged items 610 can also be obtained by data processing system 394 using a received GUID and a database that includes information identifying the item category from the GUID. Locations 615 can be expressed, e.g., in terms of either the identity of a static interrogator (e.g., interrogators 380, 378, 365) or the position during interrogation (e.g., latitude 48°8'N and longitude 11°35'E) of a dynamically moving interrogator. Times of interrogation 620 can also be transmitted to data processing system 394 from an collected data is transmitted at a known delay after the time of interrogation.

Returning to FIG. 5, the system performing method 500 also separates the collected data into pools of interrogation data (step 510). The system can separate the collected interrogation data, e.g., according to a time period in which the interrogation was performed or the location of the interrogated tag. The system can separate the interrogation data into pools, e.g., at predetermined intervals or after prompting by a user.

By way, of example, as shown in FIG. 7, data processing system 394 (FIG. 4) can separate the interrogation data from data collection 600 into pools of interrogation data 705, 710, 715 based on the room where the interrogated tag was located. In particular, pool 705 includes records 722, 724, 726, 728, 730, 732, 734, 736, 738 relating to interrogation data that indicates the presence of tags in room 315. Pool 710 includes records 740, 742, 744, 746, 748, 750, 752, 754 relating to interrogation data that indicates the presence of tags in room 325. Pool 715 includes records 756, 758, 760 relating to interrogation data that indicates the presence of tags in room 330.

The system separating the interrogation data into pools can identify the position of the interrogated tag using any of a number of different approaches. For example, the position of an interrogated tag can be determined based upon the position of a mobile tag interrogator (such as tag interrogator 384) when interrogation occurred. The mobile tag interrogator can receive information identifying its position from, e.g., a GPS or a local positioning system. Alternatively, the position of an interrogated tag can be determined based upon the interrogation range of an interrogator. For example, a series of successive interrogations by tag interrogator 372 can be used to identify that an interrogated tag is positioned in room 310. As another example, the location of an interrogated tag can be determined based upon rules applied to data collection 600. For example, if a tag that was previously located in room 315 were interrogated by tag interrogator 378, this may be sufficient to allow the system to conclude that the tag has entered room 325.

Returning to FIG. 5, the system performing method 500 eliminates any redundancies within the individual pools of interrogation data and across different pools of interrogation data (step 515). In eliminating redundancies, the system can eliminate interrogation data, e.g., relating to earlier interrogations of an item while retaining data relating to the most recent interrogation of an item. In this way, the system only retains records that identify the last known location of an item. The resulting pools of interrogation data can be referred to as "unstructured" pools since there is no description of interactions between the interrogated items in the pool.

By way of example, as shown in FIG. 8, interrogation data record 738 from pool 705 and interrogation data record 746 from pool 710 both antedate and relate to the same item (i.e., a keyboard item with the GUID of 11008) as data record 754 in pool 715. Data processing system 394 (FIG. 4) can thus eliminate interrogation data records 738, 746 on the grounds that a later record relates to the same item. As another example, data record 730 from pool 705 and data record 740 from pool 710 both antedate and relate to the same item (i.e., a monitor item with the GUID of 12347) as data record 752 from pool 710. Data processing system 394 (FIG. 4) can thus eliminate data records 730, 740 on the grounds that a later record relates to the same item. For the sake of clarity and convenience, pools 705, 710, 715 are referred to as pools 705', 710', 715' after this elimination of redundancies.

Returning to FIG. 5, the system then selects appropriate "structured" pools that have similar items to the items in the pools of interrogation data from which redundancies have been eliminated (step 515). A structured pool is a collection of items with defined relationships between the items. The basis of the relationships between items in the collection can be, e.g., the physical interaction between the components, the functional interaction between components, the temporal interactions between components, or the relative position of items in a process stream, a data stream, or other flow.

Figures 9, 10:
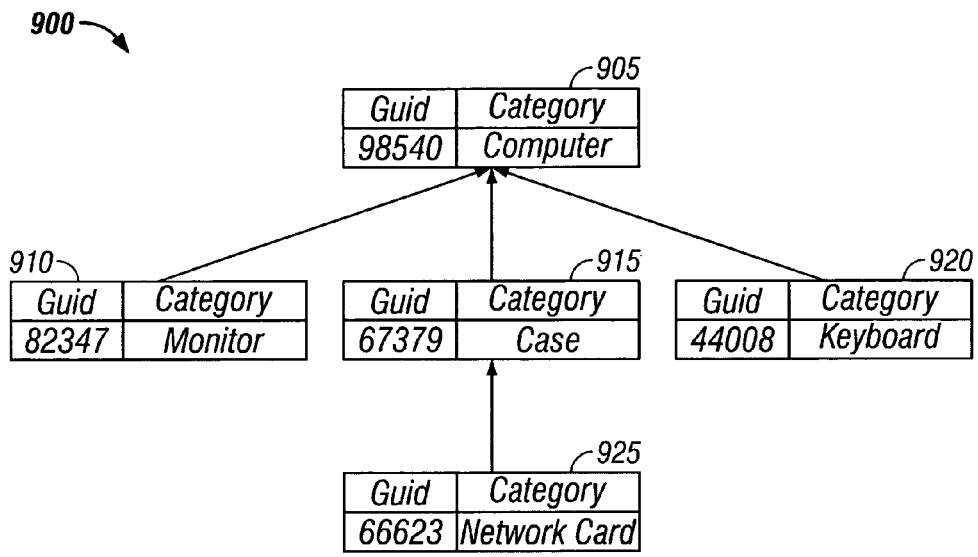
FIG. 9 shows an example of a structured pool that can be used to characterize relationships between items in a pool shown in FIG. 7.
FIG. 10 shows an example of a pool in which relationships have been characterized using the structured pool from FIG. 9.

FIG. 9 shows an example structured pool 900 that describes a computer 905. Structured pool 900 defines a keyboard 910, a case 915, and a monitor 920 as components of computer 905. Likewise, structured pool 900 defines a network card 925 as a component of case 915. The defined hierarchical component/subcomponent relationships between computer 900, keyboard 910, case 915, monitor 920, and card 925 are thus defined based, at least in part, upon the physical interaction between the items. For example, the type of card 925 mounted in computer 905 is related to the properties of case 915. Likewise, the operational capabilities of computer 905 are related to the properties of component keyboard 910, case 915, and monitor 920.

Structured pool 900 can define one or more different types of relationships using any of a number of different approaches. For example, structured pool 900 can define functional relationships, equivalency relationships, other hierarchical relationships, temporal relationships, process or data stream relationships, and other relationships between items. The relationships can be defined, e.g., using approaches such as relationship fields in tables, pointers or other links between individual objects, and relationship tables that focus on describing the relationships between items within a pool.

In selecting structured pools, the system performing method 500 compares the items in one or more structured pools with the items in the unstructured pools of interrogation data from which redundancies have been eliminated. Based upon this comparison, the system then selects appropriate structured pools for use in automatically structuring the unstructured pools of interrogation data. For example, if the items in a particular structured pool are identical to the items in an unstructured pool of interrogation data, the system can select the particular structured pool as appropriate. For example, using this approach, the system performing method 500 can select structured pool 900 as appropriate for structuring pool 710' of interrogation data.

However, the items in a structured pool need not be identical to the items in an unstructured pool of interrogation data for the system to select the structured pool as appropriate. For example, the selected structured pool can describe relationships within a subset of the items in the unstructured pool of interrogation data. Alternatively, the items in the unstructured pool can form a subset of items in the selected structured pool with defined relationships within the subset.

The system performing method 500 can also select a structured pool based upon the occurrence rate of a particular collection of relationships between similar items. For example, if ten structured pools have the same collection of relationships between items of the same category, but an eleventh structured pool has a different collection of relationships between items of the same category, then the system performing method 500 can select the most common collection of relationships for use in automatically structuring the unstructured pools of interrogation data.

Returning to FIG. 5, the system performing method 500 also structures an unstructured pool of interrogation data based upon the relationships between the items in a selected structured pool (step 525). For example, the system can copy all or a portion of the relationships between the items in the selected structured pool to the unstructured pool of interrogation data. The system can structure the pool of interrogation data, e.g., by adding a new field to a table of records in the pool, adding linkages or pointers between data objects in the pool of interrogation data, or by creating a relationship table that focus upon the relationships between items in the pool.

FIG. 10 shows an example of how pool 710' of interrogation data can be structured by the system performing method 500. In particular, the system adds a relationship field 1000 to pool 710' that identifies the hierarchical component/subcomponent relationship between the interrogated items. For example, in record 748, relationship field 1000 identifies that the case with GUID 12379 is a component of the computer. Likewise, in record 750, relationship field 1000 identifies that network card with GUID 12390 is a component of the case with GUID 12379.

Returning to FIG. 5, the system performing method 500 also presents the structured pool of interrogation data to a user (step 530). The system can present the structured pool of interrogation data using, e.g., a monitor or other display device. The system can present the pool of interrogation data after the system completes structuring or piecewise during structuring. For example, the system can prompt the user with a display asking if it is appropriate to copy a relationship between two items from the selected structured pool to two items in the unstructured pool of interrogation data.

Figure 11:
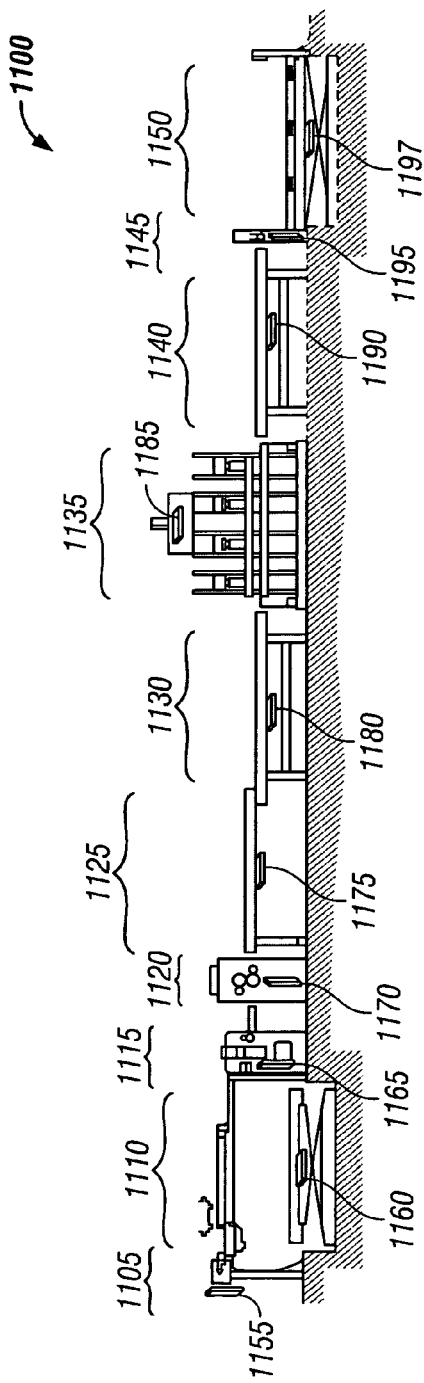
FIG. 11 shows a structure that includes tags.

FIG. 11 shows another example of a system that is tagged, namely a manufacturing line 1100 of various work-cells. In particular, manufacturing line 1100 includes a feed device 1105, a lifting table 1110, a brushing machine 1115, a surface finish applicator 1120, a disc conveyor 1125, a curing table 1130, a press 1135, a conveyor 1140, a pull device 1145, and a product bench 1150. Feed device 1105 is tagged with a tag 1155. Lifting table 1110 is tagged with a tag 1160. Brushing machine 1115 is tagged with a tag 1165. Surface finish applicator 1120 is tagged with a tag 1170. Disc conveyor 1125 is tagged with a tag 1175. Curing table 1130 is tagged with a tag 1180. Press 1135 is tagged with a tag 1185. Conveyor 1140 is tagged with a tag 1190. Pull device 1145 is tagged with a tag 1195. Product bench 1150 is tagged with a tag 1197. Tags 1155, 1160, 1165, 1170, 1175, 1180, 1185, 1190, 1195, 1197 store a computer-readable globally unique identifier ("GUI") and a category identifier that identify each item and the category of each item to a tag interrogator.

Figure 12:
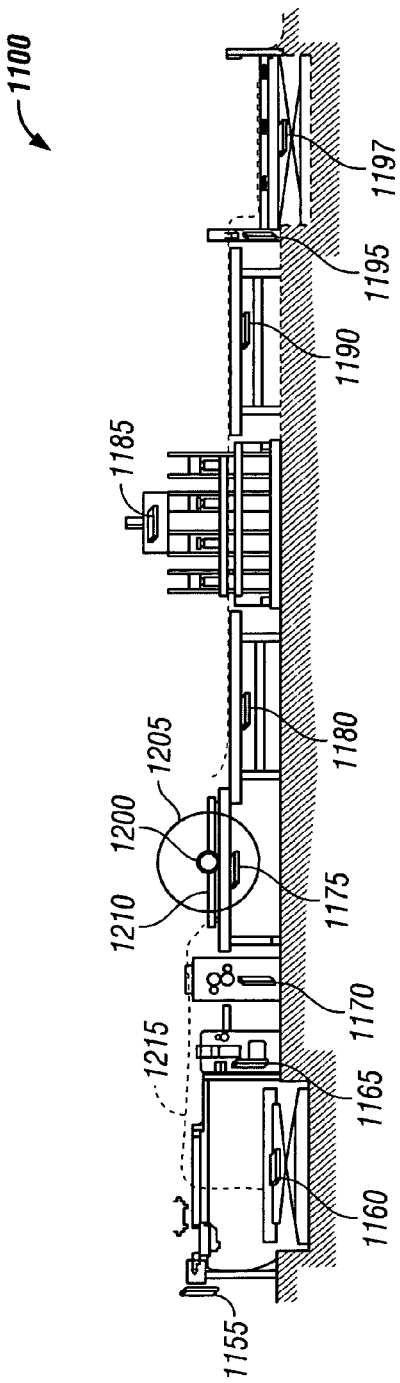
FIG. 12 shows a tag interrogator changing position in the structure of FIG. 11.

A mobile tag interrogator can be dynamically moved along manufacturing line 1100 to interrogate tags 1155, 1160, 1165, 1170, 1175, 1180, 1185, 1190, 1195, 1197. One way of dynamically moving a tag interrogator along manufacturing line 1100 is to introduce the tag interrogator into the stream of manufacturing operations performed by manufacturing line 1100. For example, as shown in FIG. 12, a tag interrogator 1200 with an interrogation range 1205 can be introduced into manufacturing line 1100 along with a workpiece 1210. Tag interrogator 1200 follows workpiece 1210 along a path 1215 along manufacturing line 1100. In moving along manufacturing line 1100, tag interrogator 1200 interrogates tags 1155, 1160, 1165, 1170, 1175, 1180, 1185, 1190, 1195, 1197 when tags 1155, 1160, 1165, 1170, 1175, 1180, 1185, 1190, 1195, 1197 are within interrogation range 1205. For example, tag interrogator 1200 interrogates tag 1175 at the position shown in FIG. 12. Thus, as tag interrogator 1200 moves along path 1215, tag interrogator 1200 collects interrogation data regarding the identity and category of the devices in manufacturing line 1100.

As shown in FIG. 13, this interrogation data can be assembled into a data collection 1300 by tag interrogator 1200 or a data processing system (not shown) that has received the interrogation data from tag interrogator 1200. Data collection 1300 can be, e.g., a table or other data structure. Data collection 1300 includes GUIDs of the interrogated tags 1305, categories of the tagged items 1310, locations where the interrogation began 1315, locations where the interrogation ended 1320, times 1325 when the interrogation began, and times 1330 when the interrogation ended. For example, data collection 1300 includes a record 1335 that describes the time and position where the interrogation of brushing machine 1115 began and ended. As another example, data collection 1300 includes records 1340, 1345, 1350 that describe the times and positions where three different interrogations of feed device 1105 began and ended. For example, records 1340, 1345, 1350 can describe interrogations that occur while workpiece 1210 rests upon lifting table 1110 and feed device 1105 feeds other workpieces into manufacturing line 1100.

GUIDs 1305, categories 1310, and times 1325, 1330 can be read from the interrogated tags 1155, 1160, 1165, 1170, 1175, 1180, 1185, 1190, 1195, 1197. Alternatively, categories 1310 can be retrieved from a database system based upon GUIDs 1305, and times 1325, 1330 can be obtained from an internal clock (not shown) of tag interrogator 1200. The locations 1315, 1320 can be received by tag interrogator 1200, e.g., from high resolution global or local positioning system.

A data processing system (not shown) can process data collection 1300 using method 500 shown in FIG. 5. For example, the system performing method 500 can pool interrogation data from a single pass along a manufacturing line to form a pool (step 510). Since the example data collection 1300 of FIG. 13 is already limited to a single pass along manufacturing line 1100, no change to data collection 1300 is needed. The system performing method 500 also eliminates redundancies from the interrogation data (step 515). For example, the system can eliminate redundant records 1340, 1345 from data collection 1300.

The system performing method 500 also locates an appropriate structured pool for use in structuring the interrogation data (step 520). For example, the system can locate a structured pool that describes items and their relationships in a previous version of manufacturing line 1100 (e.g., before substitution of one or more of the current versions of feed device 1105, lifting table 1110, brushing machine 1115, surface finish applicator 1120, disc conveyor 1125, curing table 1130, press 1135, conveyor 1140, pull device 1145, product bench 1150 for earlier version(s) in manufacturing line 1100).

The system performing method 500 structures the interrogation data by defining the relationships between the items in the pool of interrogation data. For example, the system can identify the position within the process stream performed by manufacturing line 1100 of each of feed device 1105, lifting table 1110, brushing machine 1115, surface finish applicator 1120, disc conveyor 1125, curing table 1130, press 1135, conveyor 1140, pull device 1145, and product bench 1150. The system performing method 500 can present the results of the automated structuring to a user for approval, e.g., on a relationship-by-relationship basis or after structuring is complete, as discussed above.

By automating the structuring of a description of the items in an assembly line based upon information describing the positions of the various devices and work cells in the assembly line, a user is able to rapidly determine the structure of the assembly line. For example, a system can rapidly identify that the original brushing machine in line 1100 was replaced by brushing machine 1115. This type of information is especially important in high precision manufacturing environments such as semiconductor manufacturing, where even small differences between devices and work-cells can have dramatic impacts upon the final product.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

A number of embodiments of the invention have been described. Nevertheless, it will be understood that various modifications may be made without departing from the spirit and scope of the invention. For example, a system performing method 500 can eliminate redundancies prior to pooling data. Accordingly, other embodiments are within the scope of the following claims.

What is claimed is:

1. A method for automated structuring of data representing a system of tangible items, comprising:
   receiving, at a data processing system, first item information describing a first tangible item in the system;
   receiving, at the data processing system, first item position information describing a position of the first tangible item;
   receiving, at the data processing system, second item information describing a second tangible item of the system;
   receiving, at the data processing system, second item position information describing a position of the second tangible item;
   using the data processing system to automatically characterize a component/subcomponent relationship between the first tangible item and the second tangible item based at least in part upon the first item position information and the second item position information, wherein characterizing the component/subcomponent relationship comprises the data processing system identifying a third item and a fourth item having a previously characterized component/subcomponent relationship; and
   using the data processing system to associate the first item information and the second item information to reflect the component/subcomponent relationship between the first tangible item and the second tangible item, wherein associating the first item information and the second item information comprises the data processing system copying an association between third item information and fourth item information that reflects the previously characterized component/subcomponent relationship to associate the first item information and the second item information, wherein the associating of the first item information and the second item information transforms a collection of data to reflect the component/subcomponent relationship between the first tangible item and the second tangible item.

2. The method of claim 1, wherein characterizing the component/subcomponent relationship comprises identifying that the first tangible item and the second tangible item are in a common location.

3. The method of claim 2, wherein the common location comprises a same room.

4. The method of claim 1, wherein characterizing the component/subcomponent relationship comprises determining a position of the first tangible item relative to the second tangible item.

5. The method of claim 1, wherein:
   the first tangible item belongs to a first item category;
   the second tangible item belongs to a second item category;
   identifying the third item comprises locating third item information describing that the third item belongs to the first item category; and
   identifying the fourth item comprises locating fourth item information describing that the fourth item belongs to the second item category.

6. The method of claim 1, further comprising characterizing one or more additional relationships between the first tangible item, the second tangible item, and a plurality of additional items based at least in part upon the first item position information, the second item position information, and additional position information regarding the plurality of additional items.

7. The method of claim 1, wherein:
receiving first item position information comprises interrogating a first machine-readable tag tagged to the first tangible item; and
receiving second item information comprises interrogating a second machine-readable tag tagged to the second tangible item.

8. The method of claim 7, wherein the first machine-readable tag and the second machine-readable tag are interrogated by a tag reader at a static position.

9. The method of claim 1, wherein the component/subcomponent relationship is characterized based at least in part on a structured pool comprising a third item, a fourth item, and a defined component/subcomponent relationship between the third item and the fourth item.

10. A method for the automated structuring of data representing a system of tangible items, comprising:
receiving, at a data processing system, first item information describing a first tangible item in the system;
receiving, at the data processing system, first item position information describing a position of the first tangible item;
receiving, at the data processing system, second item information describing a second tangible item of the system;
receiving, at the data processing system, second item position information describing a position of the second tangible item;
using the data processing system to automatically characterize a structural relationship between the first tangible item and the second tangible item based at least in part upon the first item position information and the second item position information, wherein characterizing the structural relationship comprises the data processing system identifying a third item and a fourth item having a previously characterized structural relationship to characterize the structural relationship; and
using the data processing system to associate the first item information and the second item information to reflect the structural relationship between the first tangible item and the second tangible item, wherein associating the first item information and the second item information comprises the data processing system copying an association between third item information and fourth item information that reflects the previously characterized structural relationship to associate the first item information and the second item information, wherein the associating of the first item information and the second item information transforms a collection of data to reflect the structural relationship between the first tangible item and the second tangible item.

11. A computer-implemented method for automated structuring of data representing a system, comprising:
receiving first item information describing a first tangible item in the system;
receiving first item position information describing a position of the first tangible item;
receiving second item information describing a second tangible item of the system;
receiving second item position information describing a position of the second tangible item;
characterizing a position in a stream of the first tangible item relative to the second tangible item based at least in part upon the first item position information and the second item position information; and
associating the first item information and the second item information to reflect the position in the stream of the first tangible item relative to the second tangible item.

12. The method of claim 11, wherein the stream comprises a manufacturing line.

13. A computer program product, tangibly embodied in machine-readable media, for automated structuring of data representing a tangible system, the computer program product being operable to cause one or more data processing devices to perform operations, the operations comprising:
receiving first item information describing a first tangible item in the system;
receiving first item position information describing a position of the first tangible item;
receiving second item information describing a second tangible item of the system;
receiving second item position information describing a position of the second tangible item;
characterizing a component/subcomponent relationship between the first tangible item and the second tangible item based at least in part upon the first item position information and the second item position information, wherein characterizing the component/subcomponent relationship comprises identifying a third item and a fourth item having a previously characterized component/subcomponent relationship; and
associating the first item information and the second item information to reflect the component/subcomponent relationship between the first tangible item and the second tangible item, wherein associating the first item information and the second item information comprises copying an association between third item information and fourth item information that reflects the previously characterized component/subcomponent relationship.

14. The computer program product of claim 13, wherein characterizing the component/subcomponent relationship comprises identifying that the first tangible item and the second tangible item are in a common location.

15. The computer program product of claim 14, wherein:
the first tangible item belongs to a first item category;
the second tangible item belongs to a second item category;
identifying the third item comprises locating third item information describing that the third item belongs to the first item category; and
identifying the fourth item comprises locating fourth item information describing that the fourth item belongs to the second item category.

16. The computer program product of claim 13, wherein the operations further comprise characterizing one or more additional relationships between the first tangible item, the second tangible item, and a plurality of additional items based at least in part upon the first item position information, the second item position information, and additional position information regarding the plurality of additional items.

17. The computer program product of claim 13, wherein:
receiving first item position information comprises interrogating a first machine-readable tag tagged to the first item; and
receiving second item information comprises interrogating a second machine-readable tag tagged to the second item.

18. The computer program product of claim 17, wherein the first machine-readable tag and the second machine-readable tag are interrogated by a tag reader at a static position.

19. The computer program product of claim 13, wherein the component/subcomponent relationship is characterized based at least in part on a structured pool comprising the third item, the fourth item, and a defined component/subcomponent relationship between the third item and the fourth item.

* * * * *